(12) United States Patent
Fukuda et al.

(10) Patent No.: US 9,820,346 B2
(45) Date of Patent: Nov. 14, 2017

(54) LIGHTING SYSTEM, ILLUMINATING SYSTEM AND ILLUMINATING FIXTURE

(71) Applicant: Panasonic Intellectual Property Management Co., Ltd., Osaka (JP)

(72) Inventors: Kenichi Fukuda, Osaka (JP); Hirofumi Konishi, Osaka (JP); Masashi Motomura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/416,076

(22) Filed: Jan. 26, 2017

(65) Prior Publication Data

US 2017/0223791 A1    Aug. 3, 2017

(30) Foreign Application Priority Data

Jan. 29, 2016  (JP) .................. 2016-016567

(51) Int. Cl.
| | |
|---|---|
| H05B 33/08 | (2006.01) |
| H05B 37/02 | (2006.01) |
| F21S 8/04 | (2006.01) |
| F21V 3/00 | (2015.01) |
| F21V 21/005 | (2006.01) |
| F21V 23/06 | (2006.01) |
| F21Y 115/10 | (2016.01) |

(52) U.S. Cl.
CPC ........... *H05B 33/0815* (2013.01); *F21S 8/04* (2013.01); *F21V 3/00* (2013.01); *F21V 21/005* (2013.01); *F21V 23/06* (2013.01); *H05B 33/0845* (2013.01); *H05B 33/0863* (2013.01); *H05B 37/0272* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2014/0159604 A1* | 6/2014 | Kato ................. | H02M 7/06 315/200 R |
| 2015/0084534 A1* | 3/2015 | Fukuda .............. | H05B 33/086 315/210 |
| 2015/0366014 A1* | 12/2015 | Itoh .................... | H05B 33/0815 315/200 R |
| 2016/0302267 A1* | 10/2016 | Matsui ............... | H05B 33/0845 |

FOREIGN PATENT DOCUMENTS

JP    2009-159653 A    7/2009

* cited by examiner

*Primary Examiner* — Jany Richardson
(74) *Attorney, Agent, or Firm* — Renner Otto Boisselle & Sklar, LLP

(57) ABSTRACT

A control circuit is configured to, when switching a state of a light source from an extinguished state to a lighting state, control a voltage conversion circuit so that a second DC voltage has a voltage value which changes according to transmission data containing an activation command. A lighting device is configured to keep the state of the light source at the extinguished state until receiving the activation command from the receiver circuit, and to change the state of the light source to the lighting state when receiving the activation command from the receiver circuit.

10 Claims, 8 Drawing Sheets

LIGHTING SYSTEM, ILLUMINATING SYSTEM AND ILLUMINATING FIXTURE

CROSS-REFERENCE TO RELATED APPLICATION

The present application is based upon and claims the benefit of priority of Japanese Patent Application No. 2016-016567, filed on Jan. 29, 2016, the entire contents of which are incorporated herein by reference.

TECHNICAL FIELD

The present disclosure relates to lighting systems, illuminating systems, and illuminating fixtures.

BACKGROUND ART

JP 2009-159653 A discloses an illuminating system which includes an illuminating fixture electrically and directly connected to a DC line in a residence or an illuminating fixture electrically connected to a DC line through a wiring device such as a ceiling-mounted socket. Such DC lines each include two DC power supply paths, and are electrically connected to an AC/DC converter provided to a residential power distribution panel. Further, such illuminating fixtures each include a light source powered by a DC voltage to light (emit light) such as a light emitting diode (LED) or organic electroluminescence element. Since the illuminating fixture is powered by DC power supplied through the DC power supply paths, the illuminating fixture need not include a power supply circuit such as an AC/DC converter for converting an AC voltage into a DC voltage.

In the conventional illuminating system described above, the illuminating fixture may be attached to the DC power supply path under live-line state (which is energized), but an input terminal of an illuminating fixture and a conductor of the DC power supply path may become incompletely connected. When a large current flows from the conductor of the DC power supply path to the input terminal of the illuminating fixture under the incomplete connection between the conductor of the DC power supply path and the input terminal of the illuminating fixture, an electric arc may be formed between them. Once the electric arc is formed, to extinguish such an electric arc is more difficult for the conventional illuminating system described above than for an illuminating system that receives an AC voltage.

SUMMARY

An objective of the present disclosure is to provide a lighting system and an illuminating system capable of suppressing an electric arc, and an illuminating fixture used therefor.

A power supply according to an aspect of the present disclosure includes a signal transmitting device, signal receiving device, and a lighting device. The signal transmitting device includes a transmitter-side input for receiving a first DC voltage, a transmitter-side output for outputting a second DC voltage, a voltage conversion circuit configured to convert the first DC voltage into the second DC voltage, and a control circuit configured to control the voltage conversion circuit so that the second DC voltage has a voltage value which changes according to transmission data in a predetermined transmission period. The signal receiving device includes a receiver-side input electrically connected to the transmitter-side output so as to receive the second DC voltage, and a receiver circuit configured to obtain the transmission data by detecting change in the voltage value of the second DC voltage. The lighting device is configured to light a light source with the second DC voltage, and change a state of the light source according to the transmission data received from the receiver circuit. The control circuit is configured to, when switching the state of the light source from an extinguished state to a lighting state, control the voltage conversion circuit so that the second DC voltage has a voltage value which changes according to the transmission data containing an activation command. The lighting device is configured to keep the state of the light source at the extinguished state until receiving the activation command (light level control signal) from the receiver circuit, and to change the state of the light source to the lighting state when receiving the activation command from the receiver circuit.

A lighting system of another aspect according to the present disclosure includes the lighting system, and a light source to be lit by the lighting device of the lighting system.

An illuminating fixture of another aspect according to the present disclosure includes a lighting device configured to light a light source with an externally provided DC voltage, and change a state of the light source according to transmission data; and a receiver circuit configured to obtain the transmission data by detecting change in a voltage value of the DC voltage and provide the transmission data to the lighting device. The lighting device being configured to keep the state of the light source at an extinguished state until receiving an activation command included in the transmission data from the receiver circuit, and change the state of the light source to the lighting state when receiving the activation command from the receiver circuit.

The lighting system and the illuminating system of the above aspects according to the present disclosure can suppress the electric arc.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, a lighting system and an illuminating system of embodiments according to the present disclosure are described in detail with reference to the attached drawings. The embodiments described below relate to a lighting system and an illuminating system transmitting a transmission signal by changing (adjusting) a voltage value of a DC voltage. Note that, the embodiments described below are merely some of possible embodiments of the present disclosure, and may be modified according to design or the like.

Figure 1:
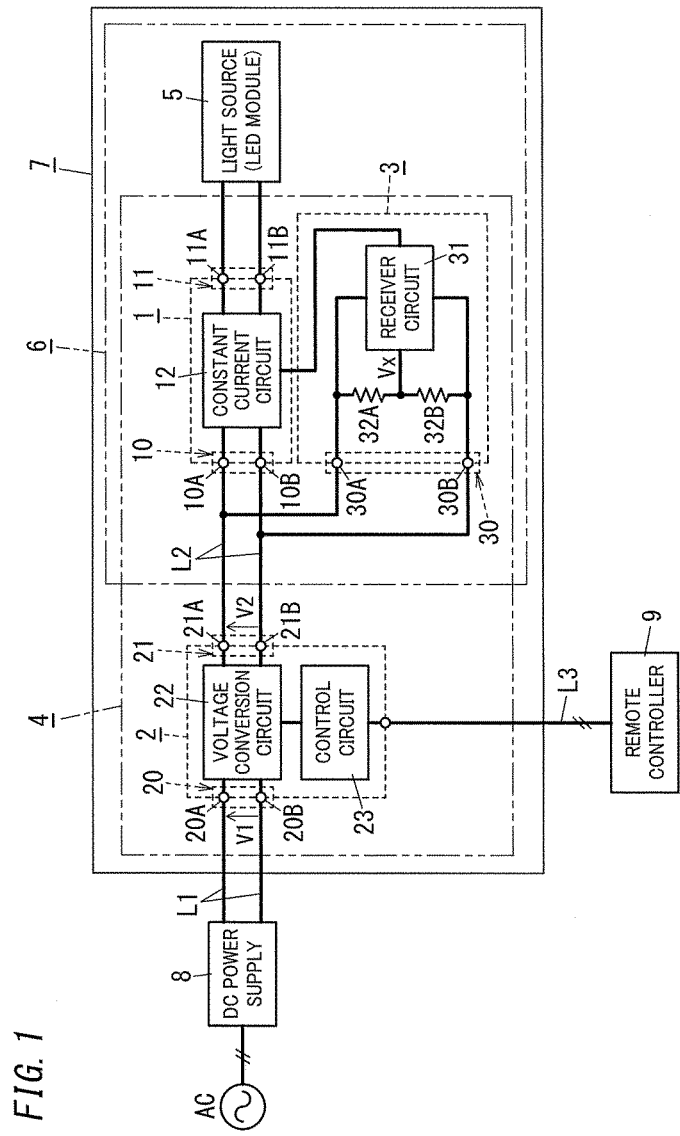
FIG. 1 is a system configuration diagram of a lighting system and an illuminating system of one embodiment according to the present disclosure.

As shown in FIG. 1, a lighting system 4 includes a lighting device 1, a signal transmitting device 2, and a signal receiving device 3. Note that, preferably, the lighting system 4 may be installed in a living room of a residence, but may be installed in an office of a business place store premises, or the like.

The signal transmitting device 2 includes a transmitter-side input 20, a transmitter-side output 21, a voltage conversion circuit 22, and a control circuit 23. The transmitter-side input 20 includes a first input terminal 20A and a second input terminal 20B. Preferably, the first and second input terminals 20A and 20B may include screw terminals or quick connection terminals, for example. The transmitter-side input 20 is electrically connected to a first power supply path L1 and thus can receive a DC voltage (a first DC voltage V1) through the first power supply path L1. The first power supply path L1 includes two electric wires. A first one of the two electric wires electrically connects the first input terminal 20A and a positive electrode side-output terminal of the DC power supply 8. A second one of the two electric wires electrically connects the second input terminal 20B and a negative electrode side-output terminal of the DC power supply 8.

The DC power supply 8 converts an AC voltage supplied from a power system AC into a DC voltage and outputs the resultant DC voltage to the first power supply path L1 through the positive and negative electrode-side output terminals. The AC voltage supplied from the power system AC may have an effective value of 100 [V], and a power supply frequency of 50 [Hz] or 60 [Hz], for example. The DC voltage outputted from the DC power supply 8 may have a rated value in a range of 30 [V] to 40 [V], for example. The DC power supply 8 may include an input filter, a full-wave rectifier, and a DC/DC converter such as a power factor improvement circuit and a step-down chopper circuit, for example. Preferably, the DC power supply 8 may be placed inside a power distribution panel for indoor wiring such as a residential power distribution panel. However, above described configuration of the DC power supply 8 is a mere example. Alternatively, the DC power supply 8 may increase or decrease a DC voltage supplied from a photovoltaic power system and thus output a resultant voltage to the first power supply path L1, for example. Note that, when the DC power supply 8 is not used, the signal transmitting device 2 may itself include an AC/DC converter for converting an AC voltage supplied from the power system AC into a DC voltage.

Further, the voltage conversion circuit 22 of the signal transmitting device 2 is configured to convert the first DC voltage V1 received by the transmitter-side input 20 into a second DC voltage V2 (as shown in FIG. 1). The second DC voltage V2 is outputted from the transmitter-side output 21 to a second power supply path L2. The transmitter-side output 21 includes a first output terminal 21A and a second output terminal 21B. Preferably, the first and second output terminals 21A and 21B may include screw terminals or quick connection terminals, for example. The transmitter-side output 21 is electrically connected to the second power supply path L2 and thus can output the second DC voltage V2 to the second power supply path L2. The second power supply path L2 includes two electric wires. A first one of the two electric wires has a first end electrically connected to the first output terminal 21A. A second one of the two electric wires has a first end electrically connected to the second output terminal 21B.

Figure 2A:
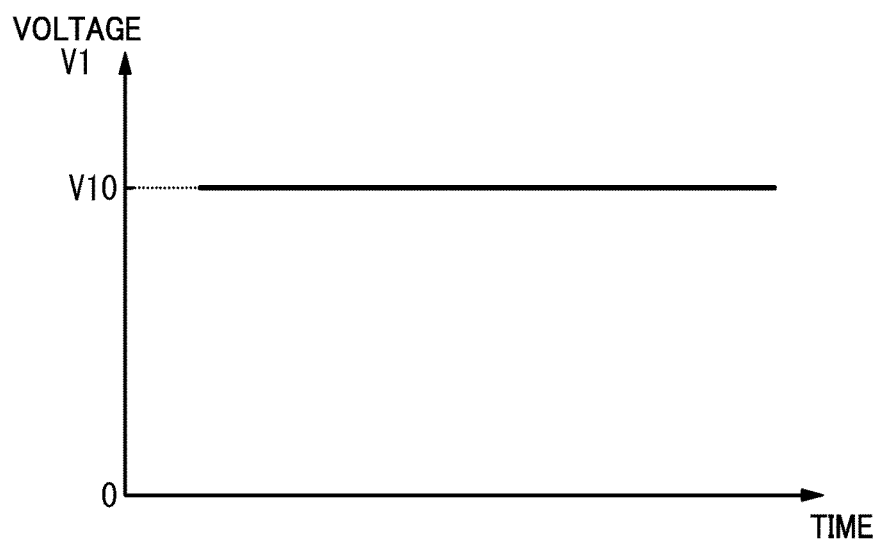
FIG. 2A is a waveform chart of a first DC voltage inputted into a signal transmitting device of the lighting system.

The voltage conversion circuit 22 may preferably include a variable three-terminal regulator with a variable output voltage, for example. In detail, the voltage conversion circuit 22 is controlled by the control circuit 23 so that a voltage value of the second DC voltage V2 can be switched between a first voltage value V21 and a second voltage value V22 (see FIG. 2B). Preferably, the first voltage value V21 may be a rated value of the second DC voltage V2 (rated value of the output voltage of the power conversion circuit 22). Note that, the first voltage value V21 may be equal to or different from a rated voltage value V10 (see FIG. 2A) of the first DC voltage V1. Additionally, the second voltage value V22 may be equal to or larger than a voltage value Vf necessary for the lighting device 1 to turn on (light) a light source 5. Alternatively, the voltage conversion circuit 22 may include a switching regulator instead of a variable three-terminal regulator. The variable three-terminal regulator can only decrease an input voltage, whereas the switching regulator can decrease an input voltage and alternatively can increase or increase and decrease an input voltage. For this reason, when the voltage value of the second DC voltage V2 is set to be higher than the voltage value of the first DC voltage V1, it is preferable that the voltage conversion circuit 22 may include a step-up switching regulator.

The control circuit 23 may include a microcontroller or a control IC. The control circuit 23 is configured to receive a control signal transmitted from a remote controller 9 through a signal line L3. Additionally, the control circuit 23 is configured to convert a light level indicated by the control signal received into transmission data, and control the voltage conversion circuit 22 according to the transmission data. Note that, the light level is defined as a value ([%]) representing in percentage terms, and is a ratio of a current supplied to the light source 5 to a rated value. The transmission data may be constituted by a sequence of 8 bits representing up to 256 values individually associated with 256 light levels, for example. For example, the light level of 100 [%] is associated with (converted into) a sequence of bits of "00000000". The light level of 0 [%] (turning off, extinguishing) is associated with (converted into) a sequence of bits of "11111111". The light level of 50 [%] is associated with (converted into) a sequence of bits of "10000000". Note that, the number of light levels may not necessarily be 256, but may be 128, 512, or one or more to twenty or less levels, for example.

Figure 2B:
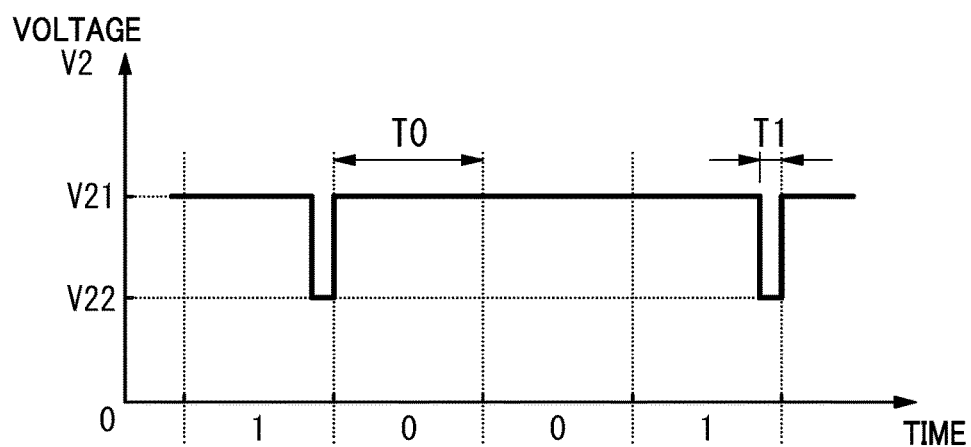
FIG. 2B is a waveform chart of a transmission signal transmitted from the signal transmitting device of the lighting system.

For example, when a given one of bits of the transmission data has a value of "1", the control circuit 23 controls the voltage conversion circuit 22 so as to change (adjust) the voltage value of the second DC voltage V2 to the second voltage value V22 smaller than the first voltage value V21 (see FIG. 2B). In contrast, when a given one of bits of the transmission data has a value of "0", the control circuit 23 controls the voltage conversion circuit 22 so as to change (adjust) the voltage value of the second DC voltage V2 to the first voltage value V21 (see FIG. 2B). In detail, the control circuit 23 is configured to define a transmission period for transmitting the transmission data of 8 bits as eight time slots having a constant time width T0 (see FIG. 2B). When a given one of bits of the transmission data is "1", the control circuit 23 controls the voltage conversion circuit 22 so that the voltage value of the second DC voltage V2 is kept changed to the second voltage value V22 within a time duration T1 shorter than the time width T0 of the time slot (see FIG. 2B). Note that, the control circuit 23 controls the voltage conversion circuit 22 so that an end timing of the time slot coincides with a rising edge of the second DC voltage V2 (timing of an increase from the second voltage value V22 to the first voltage value V21). However, it is sufficient that the control circuit 23 may change the voltage value of the second DC voltage V2 to the second voltage value V22 within a given period in the time slot. For example, the control circuit 23 may control the voltage conversion circuit 22 so that a start timing of the time slot coincides with a falling edge of the second DC voltage V2 (timing of a decrease from the first voltage value V21 to the second voltage value V22).

In this regard, the control circuit 23 controls the voltage conversion circuit 22 to send a start bit indicating start of the transmission period prior to a first bit of the transmission data and send a stop bit indicating end of the transmission period subsequent to a last bit of the transmission data. For example, the start bit may be a sequence of bits of "111", and the stop bit may be a sequence of bits of "000". Note that, the transmission data has a fixed length of 8 bits. For this reason, even when the stop bit is not transmitted from a transmitter side (the signal transmitting device 2), a receiver side (the signal receiving device 3) can still determine whether the transmission period has ended. Note that, in the present embodiment, a signal transmitted by switching a voltage between wires of the power supply path L2 (the second DC voltage V2) between the first voltage value V21 and the second voltage value V22 within the transmission period is named as a transmission signal. The transmission signal may include the start bit, the transmission data, and the stop bit, but may not include the stop bit if necessary. Further, the control circuit 23 is configured to, in a period different from the transmission period (a period other than the transmission period), control the voltage conversion circuit 22 so as to keep the voltage value of the second DC voltage V2 equal to the first voltage value V21.

Figure 3:
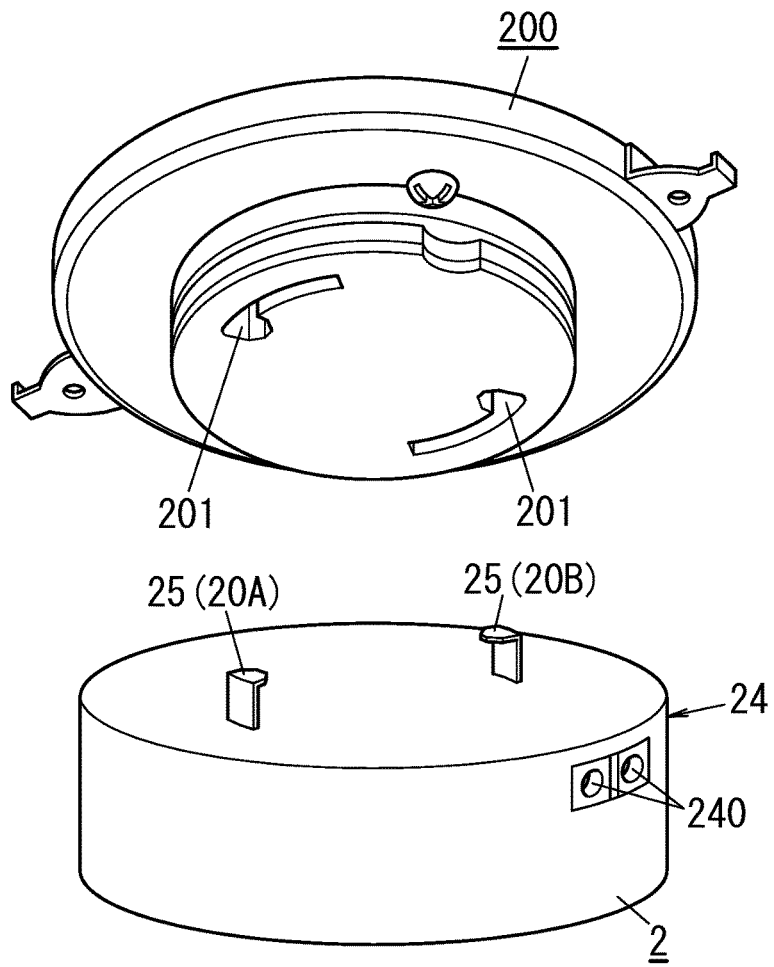
FIG. 3 is a perspective view of the signal transmitting device of the lighting system and a ceiling-mounted socket.

Note that, the first power supply path L1 may be electrically connected to a wiring device for delivering the power supply. For example, the wiring device for delivering the power supply may be a ceiling-mounted socket 200 installed in a ceiling (a finishing material of ceilings) of a residence (see FIG. 3). The ceiling-mounted socket 200 is electrically connected to the first power supply path L1 which may be preliminarily installed above the ceiling and thus is supplied with DC power from the DC power supply 8 through the first power supply path L1. As shown in FIG. 3, the signal transmitting device 2 includes a housing 24 in a hollow circular cylindrical shape. Preferably, the housing 24 may be made of material with electrically insulating properties such as synthetic resin, for example. There is a pair of hooking-blades 25 protruding from an upper face of the housing 24. By engaging the pair of hooking-blades 25 with hooking-blade receivers 201 of the ceiling-mounted socket 200, the signal transmitting device 2 is mechanically and electrically connected to the ceiling-mounted socket 200. In summary, the pair of hooking-blades 25 serves as the first and second input terminals 20A and 20B of the transmitter-side input 20. The housing 24 accommodates a pair of quick connection terminals, and this pair of quick connection terminals electrically connects the first and second output terminals 21A and 21B of the transmitter-side output 21 of the signal transmitting device 2 to the second power supply path L2. Note that, the housing 24 includes at its outer periphery a pair of electric wire insertion holes 240 for allowing connection of electric wires to the pair of quick connection terminals.

Figure 5:
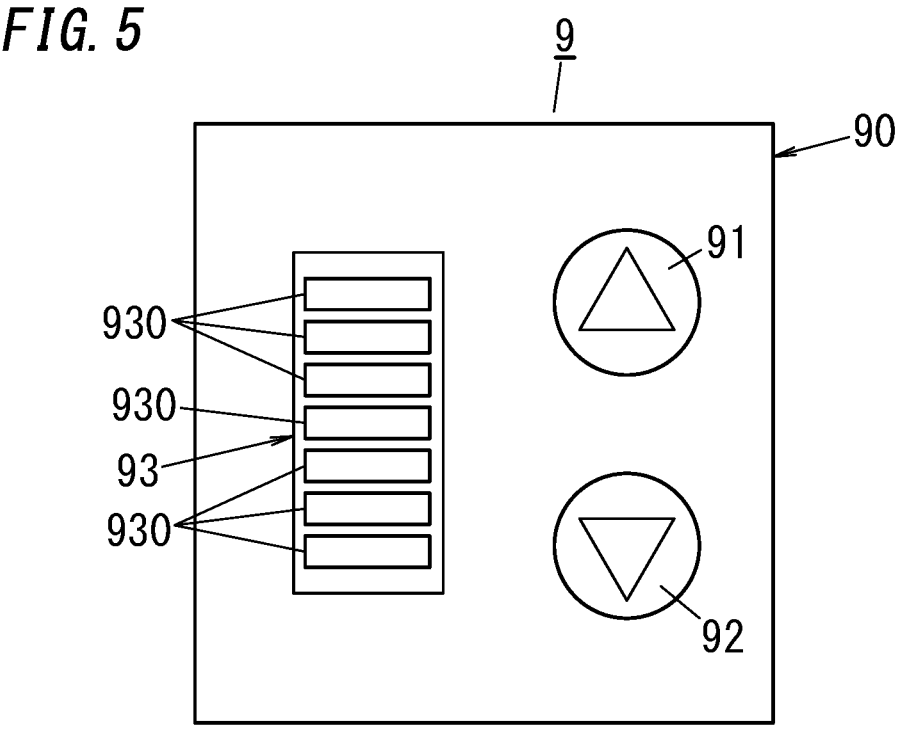
FIG. 5 is a front view of a remote controller used together with the lighting system.

As shown in FIG. 5, the remote controller 9 includes a body 90 of a synthetic resin molded product. The body 90 is attached to a wall so that part (mainly, a rear part) of the body 90 is inserted into a recess created in a wall material, for example. Additionally, the remote controller 9 includes a first manual operation button 91, a second manual operation button 92, and a display 93. The first manual operation button 91 is exposed on a front face of the body 90. The second manual operation button 92 is exposed on the front face of the body 90 so as to be beneath the first manual operation button 91. The display 93 includes seven display elements (e.g., light emitting diodes) 930 arranged in a line along a vertical direction. The display 93 is configured to light a predetermined number of seven display elements 930 according to the light level which is set by a user pushing the first manual operation button 91 and the second manual operation button 92.

When the first manual operation button 91 is pushed, the remote controller 9 increases the light level from a value immediately before the first manual operation button 91 is pushed, and sends through the signal line L3 a light level control signal indicative of the light level increased. In contrast, when the second manual operation button 92 is pushed, the remote controller 9 decreases the light level from a value immediately before the first manual operation button 91 is pushed, and sends through the signal line L3 a light level control signal indicative of the light level decreased. Additionally, the remote controller 9 lights the uppermost display element 930 when the light level is 100[%], and lights a lower display element 930 as the light level becomes lower. Hence, a person operating the remote controller 9 can roughly perceive the light level by checking which one of the display elements 930 of the display 93 lights. Note that, a device used for controlling the light level of an illuminating fixture like the aforementioned remote controller 9 is also called a dimmer in some cases.

As shown in FIG. 1, the lighting device 1 includes a lighting-side input 10, a lighting-side output 11, and a constant current circuit 12. The lighting-side input 10 includes a first input terminal 10A and a second input terminal 10B. Preferably, the first and second input terminals 10A and B may include screw terminals or quick connection terminals, for example. The lighting-side input 10 is electrically connected to the second power supply path L2 and thus can receive the second DC voltage V2 through the second power supply path L2. The first input terminal 10A is electrically connected to the first one, which is electrically connected to the first output terminal 21A of the signal transmitting device 2, of the two electric wires constituting the second power supply path L2. The second input terminal 10B is electrically connected to the second one, which is electrically connected to the second output terminal 21B of the signal transmitting device 2, of the two electric wires constituting the second power supply path L2.

The lighting-side output 11 includes a first output terminal 11A and a second output terminal 11B. Preferably, the first and second output terminals 11A and 11B may include screw terminals or quick connection terminals, for example. The lighting-side output 11 is electrically connected to the light source 5. For example, the light source 5 includes one or more LED modules. The LED module may include a mounting substrate, one or more LED chips mounted on one surface of the mounting substrate, and an encapsulating member for encapsulating the one or more LED chips, for example. The encapsulating member may be made of light transmissive encapsulating material such as silicone resin. Note that, the LED chip may be a blue LED chip for emitting blue light, and the encapsulating material contains phosphor for converting blue light into yellow light. In summary, the LED module is designed to emit white light obtained by mixing the blue light with the yellow light. Note that, the light source 5 is not limited to one or more LED modules, but may be a straight LED lamp or an organic electroluminescence element, for example.

The first output terminal 11A is electrically connected to a positive electrode of the light source 5 (an anode electrode of an LED module). The second output terminal 11B is electrically connected to a negative electrode of the light source 5 (a cathode electrode of an LED module). The constant current circuit 12 includes a DC/DC converter such as a switching regulator and a series regulator. For example, when a rated voltage value (the first voltage value V21) of the second DC voltage V2 inputted from the signal transmitting device 2 into the lighting-side input 10 is higher than a rated voltage of the light source 5, the constant current circuit 12 may preferably include a step-down chopper circuit. Alternatively, when the first voltage value V21 is lower than the rated voltage of the light source 5, the constant current circuit 12 may preferably include a step-up chopper circuit. In the present embodiment, the rated voltage value of the second DC voltage V2 is higher than the rated voltage of the light source 5, and accordingly the constant current circuit 12 includes a step-down chopper circuit.

Figure 4:
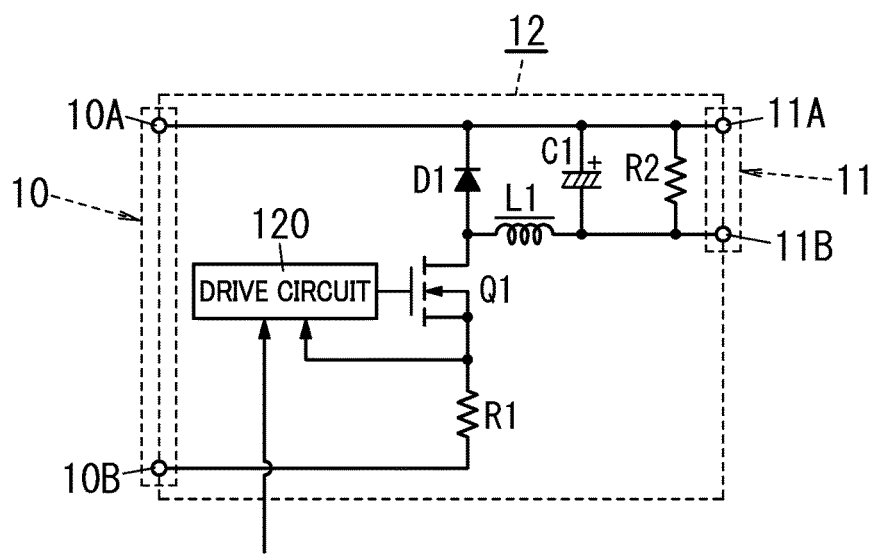
FIG. 4 is a circuit diagram of a constant current circuit of the lighting device of the lighting system.

As shown in FIG. 4, the constant current circuit 12 includes a step-down chopper circuit and a drive circuit 120 for driving the step-down chopper circuit. In the step-down chopper circuit, a cathode of a diode D1 is electrically connected to the first input terminal 10A, and a series circuit of a switching element Q1 and a resistor R1 is disposed between an anode of the diode D1 and the second input terminal 10B. An electrolytic capacitor as a smoothing capacitor C1 and an inductor L1 are electrically connected in series between the cathode and the anode of the diode D1. A resistor R2 for discharge is electrically connected between both ends of the smoothing capacitor C1. The light source 5 is electrically connected between the first output terminal 11A and the second output terminal 11B of the lighting-side output 11. The drive circuit 120 is configured to turn on and off the switching element Q1 with a high frequency. In detail, the drive circuit 120 is configured to detect magnitude of a current flowing through the switching element Q1 based on a voltage across the resistor R1, and to turn off the switching element Q1 when the magnitude of the current reaches a desired value. Additionally, the drive circuit 120 is configured to turn on the switching element Q1 at a constant period or when a current flowing through the inductor L1 reaches zero. With the drive circuit 120 turns on and off the switching element Q1 as the above mentioned manner, it is possible to make the magnitude of the current supplied to the light source 5 equal to a desired value. Preferably, when the desired value is changed, the constant current circuit 12 increases or decreases the output current so as to turn off (be extinguished), light at rated power, or light at given power the light source 5.

As shown in FIG. 1, the signal receiving device 3 includes a receiver-side input 30, a receiver circuit 31, and a voltage dividing circuit. The receiver-side input 30 includes a pair of receiver-side input terminals 30A and 30B. Preferably, these receiver-side input terminals 30A and 30B may include screw terminals or quick connection terminals, for example. Note that, the receiver-side input terminals 30A and 30B of the receiver-side input 30 may be electrically connected, in the lighting device 1, to the first and second input terminals 10A and 10B of the lighting-side input 10, respectively. Additionally, a printed circuit serving as the constant current circuit 12 of the lighting device 1 and a printed circuit serving as the receiver circuit 31 and the voltage dividing circuit of the signal receiving device 3 may be formed on the same printed circuit board. The receiver-side input 30 is electrically connected to the second power supply path L2 and thus can receive the second DC voltage V2 through the second power supply path L2. The receiver-side input terminal 30A is electrically connected to the first output terminal 21A of the signal transmitting device 2 through the first one of the two electric wires constituting the second power supply path L2. The receiver side input terminal 30B is electrically connected to the second output terminal 21B of the signal transmitting device 2 through the second one of the two electric wires constituting the second power supply path L2.

As shown in FIG. 1, the voltage dividing circuit includes a series circuit of two resistors 32A and 32B. The voltage dividing circuit is electrically connected between the pair of receiver-side input terminals 30A and 30B. The voltage dividing circuit can output a voltage (a detection voltage Vx) divided from a voltage between electric wires of the second power supply path L2 (the second DC voltage V2) to the receiver circuit 31. The receiver circuit 31 may include a microcontroller or a control IC. The receiver circuit 31 samples the detection voltage Vx inputted from the voltage dividing circuit at a constant sampling period and stores it in a buffer memory. Note that, the sampling period is set to be shorter than the time duration T1 in which the signal transmitting device 2 transmits one bit of the transmission data.

The receiver circuit 31 compares the sampled value (a voltage value of the detection voltage Vx) stored in the buffer memory with a threshold value to thereby receive the transmission signal (the start bit, the transmission data, and the stop bit). In detail, when the sampled value falls below the threshold value, the receiver circuit 31 determines reception of a bit of "1" and then stores the bit ("1") in the buffer memory. When receiving the start bit, the receiver circuit 31 receives the transmission data transmitted subsequent to the start bit, and stores it in the buffer memory. When receiving the stop bit, the receiver circuit 31 finishes storing of data in the buffer memory.

The receiver circuit 31 obtains the light level from the transmission data stored in the buffer memory. Additionally, the receiver circuit 31 converts the obtained light level into a PWM signal, and then outputs it to the constant current circuit 12 of the lighting device 1. The receiver circuit 31 changes a duty cycle of a rectangular wave with a constant period according to the light level, thereby converting the light level into the PWM signal. For example, the receiver circuit 31 sets the duty cycle to 100[%] when the light level is 100[%], and sets the duty cycle to 0[%] when the light level is 0[%], and sets the duty cycle to 50[%] when the light level is 50[%]. Alternatively, the receiver circuit 31 may convert the light level into a voltage signal with a voltage value representing the light level.

In contrast, the constant current circuit 12 changes the desired value of the output current according to the PWM signal received from the receiver circuit 31. For example, when the duty cycle of the PWM signal is 100[%], the constant current circuit 12 sets the desired value of the output current to a rated value (a current value of a rated current of the light source 5). Further, when the duty cycle of the PWM signal is 50[%], the constant current circuit 12 sets the desired value of the output current to half of the rated value. Note that, when the duty cycle of the PWM signal is 0[%], the constant current circuit 12 ends outputting of the output current to turn off the light source 5.

Figure 6:
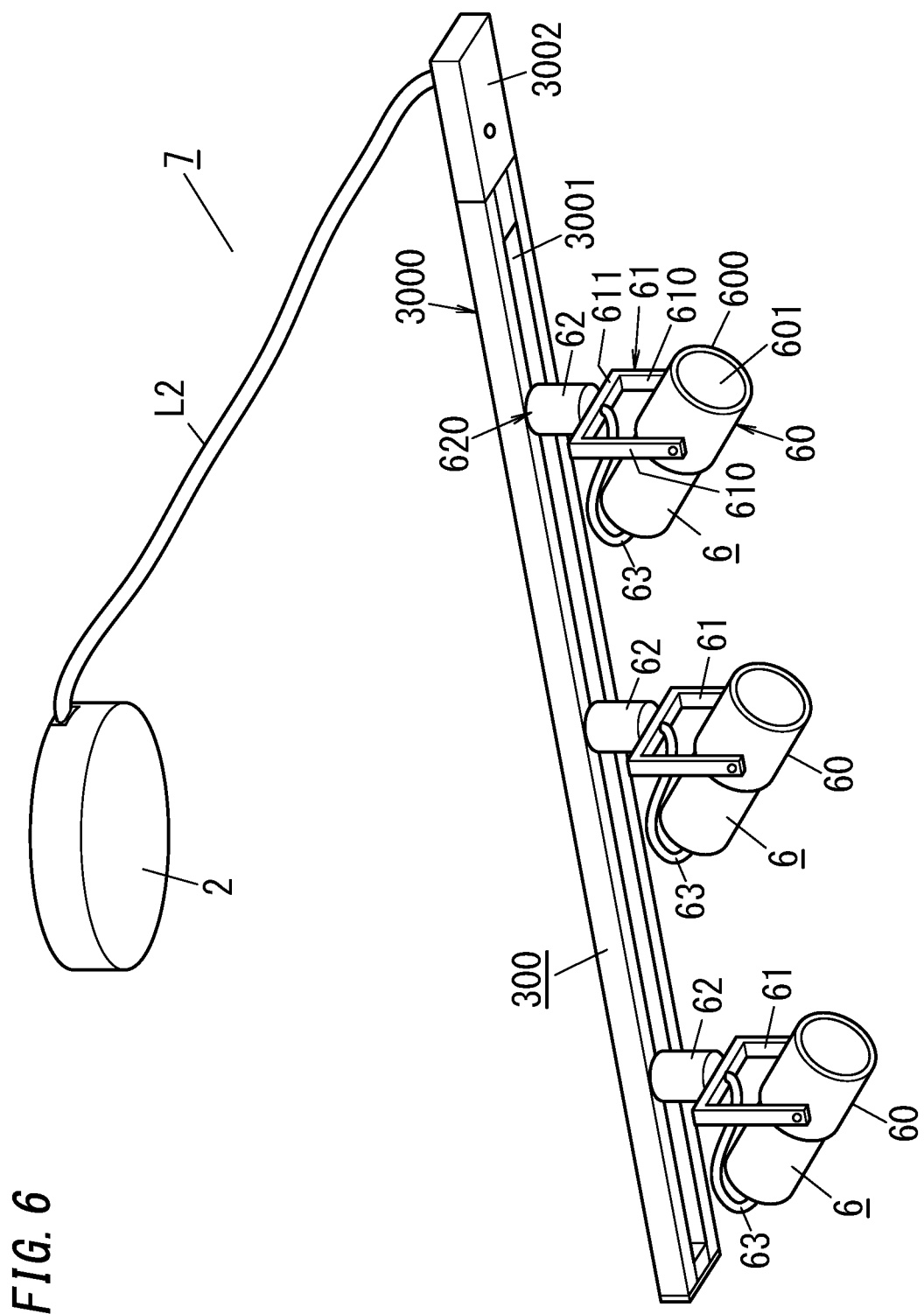
FIG. 6 is a system configuration diagram of the illuminating system.

Note that, the lighting device 1, the signal receiving device 3, and the light source 5 may be included in components of an illuminating fixture 6. For example, as shown in FIG. 6, the illuminating fixture 6 is a spotlight used in combination with a lighting duct for illuminating fixtures (hereinafter, referred to as "duct") 300. The duct 300 is attached to a ceiling (a lower face of a finishing material of ceilings). The duct 300 includes a duct body 3000 of synthetic resin, and two conductors (not shown) accommodated inside the duct body 3000. The duct body 3000 has a hollow elongated cuboidal shape. The duct body 3000 has at its lower face an insertion opening 3001 which has a straight shape extending along a lengthwise direction of the duct body 3000. The two conductors are fixed inside the duct body 3000 so as to be on opposite sides of the insertion opening 3001 when viewed from the lower side. Further, there is a feed-in unit 3002 electrically and mechanically connected to one end in the lengthwise direction of the duct body 3000. The feed-in unit 3002 electrically connects the two electric wires of the second power supply path L2 to the two conductors inside the duct body 3000 individually. Therefore, the duct 300 is supplied with the second DC voltage V2 from the signal transmitting device 2.

As shown in FIG. 6, the illuminating fixture 6 includes a body 60, an arm 61, and a plug 62. The body 60 is made of metal or synthetic resin. The body 60 has a shape that two hollow circular cylinders with different diameters are connected in their common axial direction. The body 60 accommodates inside the light source 5, the lighting device 1, and the signal receiving device 3. Note that, a printed circuit including the constant current circuit 12 of the lighting device 1 and a printed circuit including the receiver circuit 31 and the voltage dividing circuit of the signal receiving device 3 may be included in the same printed circuit board. The body 60 has one end facing the light source 5 and provided with a window hole 600. The window hole 600 is fitted with a panel 601 made of light transmissive material such as glass and acrylic resin. Light produced by the light source 5 is radiated to an illumination space through the panel 601. The plug 62 includes a plug body 620 with a hollow cylindrical shape, and a pair of electrode plates (not shown) protruding from an upper face of the plug body 620. The pair of electrode plates are inserted into the duct body 3000 via the insertion opening 3001 and then in contact with the two conductors fixed inside the duct body 3000 individually. Note that, the pair of electrode plates of the plug 62 are electrically connected to the first and second input terminals 10A and 10B of the lighting device 1 accommodated in the body 60 through an electric cable 63. The arm 61 includes a pair of supporting pieces 610 for supporting the body 60 and an interconnecting piece 611 for interconnecting the pair of supporting pieces 610. The arm 61 is attached at a center of the interconnecting piece 611 to the lower face of the plug body 620 in a rotatable manner within a horizontal plane. Further, the pair of supporting pieces 610 of the arm 61 is attached to opposite side faces of the body 60 in a rotatable manner within a vertical plane.

The illuminating fixture 6 is electrically and mechanically connected to the duct 300 through the plug 62. Hence, the illuminating fixture 6 lights with DC power supplied through the duct 300. Note that, an illuminating system 7 includes the signal transmitting device 2 and the illuminating fixture 6 (the light source 5, the lighting device 1, and the signal receiving device 3) (see FIG. 1). As shown in FIG. 6, the illuminating system 7 may include the signal transmitting device 2 and a plurality of the illuminating fixtures 6.

Hereinafter, operations of the lighting system 4 and the illuminating system 7 are described.

For example, a person is assumed to change the light level from 100[%] to 50[%] by pushing the second manual operation button 92 of the remote controller 9. The remote controller 9 sends a light level control signal indicative of the light level of 50[%] through the signal line L3. When receiving the light level control signal from the remote controller 9, the control circuit 23 of the signal transmitting device 2 converts the light level (50[%]) indicated by the light level control signal into the transmission data (a sequence of 8 bits of "10000000"). Further, the control circuit 23 controls the voltage conversion circuit 22 so as to send the start bit first, then send the transmission data, and finally send the stop bit.

The transmission signal which is sent from the signal transmitting device 2 through the second power supply path L2 is received by the signal receiving devices 3 of all the illuminating fixtures 6 through the second power supply path L2 (including the conductors of the duct 300). The receiver circuit 31 of the signal receiving device 3 obtains the light level (50[%]) from the transmission data included in the transmission signal received, and further converts the light level obtained, into the PWM signal. In summary, the receiver circuit 31 generates the PWM signal with the duty cycle of 50[%], and outputs the PWM signal generated, to the constant current circuit 12 of the lighting device 1.

The constant current circuit 12 sets the desired value of the output current to half of the rated value according to the duty cycle (50[%]) of the PWM signal. Therefore, the current value of the output current outputted from the lighting-side output 11 of the lighting device 1 to the light source 5 becomes equal to half of the rated value. Accordingly, an amount of light (light flux) emitted from the light source 5 also becomes almost half of an amount of light produced by rated lighting. As a result, amounts of light of all the illuminating fixtures 6 connected to the duct 300 are each adjusted to half of the amount of light produced by rated lighting.

In a conventional illuminating system, a communication signal (the transmission signal) for data transmission that employs a high frequency carrier is superimposed on a DC voltage. However, in a case where the transmission signal generated by modulating the high frequency carrier is superimposed on the DC voltage like the case of the illuminating system, the indoor wiring is likely to act like an antenna to thus emits electromagnetic waves (considered to be noise), and the transmission signal (considered to be noise) is likely to be leaked to an adjacent residence through a power supply cable. In contrast, the lighting system 4 and the illuminating system 7 vary the voltage value of the DC voltage (the second DC voltage V2) supplied through the second power supply path L2 to thereby send the transmission data (the light level). Therefore, the lighting system 4 and the illuminating system 7 can offer a decrease in noise which is potentially caused by transmission and reception of the transmission data compared with a case of superimposing the transmission signal generated by modulating the high frequency carrier on the DC voltage. Additionally, both the signal transmitting device 2 and the signal receiving device 3 need not include an oscillator for generating high frequency carriers, and thus circuit configuration thereof can be simplified.

Note that, the signal receiving devices 3 may have unique addresses. When the signal receiving device 3 have unique addresses, the control circuit 23 of the signal transmitting device 2 may send a desired address bit indicative of an address following the start bit, and thereafter send the transmission data. When the address indicated by the address bit of the received transmission signal is identical to the unique address of the signal receiving device 3, the receiver circuit 31 of the signal receiving device 3 converts the light level obtained from the transmission data into the PWM signal and outputs the resultant PWM signal to the lighting device 1. In contrast, when the address indicated by the address bit is not identical to the unique address of the signal receiving device 3, the receiver circuit 31 does not obtain the light level from the transmission data and discards the transmission data. Allocating unique addresses to the signal receiving devices 3 in such a manner allows individual turning on (lighting) and off (extinguishing) and dimming a plurality of illuminating fixtures 6 connected to the duct 300.

Note that, the light source 5 may include multiple kinds of LED modules with different light emission colors. For example, the light source 5 may include a first LED module for emitting white light and a second LED module for emitting light of a light (lamp) color. Additionally, the lighting device 1 may preferably include a first constant current circuit for lighting the first LED module and a second constant current circuit for lighting the second LED module. The transmission data which indicates a first light level of the first LED module and a second light level of the second LED module is sent from the signal transmitting device 2 to the signal receiving device 3. The receiver circuit 31 of the signal receiving device 3 converts the first light level received from the signal transmitting device 2 into the PWM signal and outputs the resultant PWM signal to the first constant current circuit. Similarly, the receiver circuit 31 of the signal receiving device 3 converts the second light level received from the signal transmitting device 2 into the PWM signal and outputs the resultant PWM signal to the second constant current circuit. Accordingly, the first constant current circuit provides a current having a desired value corresponding to the PWM signal received from the receiver circuit 31, to the first LED module. The second constant current circuit provides a current having a desired value corresponding to the PWM signal received from the receiver circuit 31, to the second LED module. Therefore, the light source 5 emits light which is a mixture (or has a mixed color) of white light produced by the first LED module and light (lamp) color light produced by the second LED module. In summary, the illuminating fixture 6, the lighting system 4 and the illuminating system 7 can offer adjustment of a color of light of the light source 5 according to a ratio of the first light level to the second light level.

Note that, the transmission data is not limited to the light level. For example, when an illuminating fixture includes a speaker therein, the transmission data may be a sound (music) file. In this case, the signal transmitting device 2 may send the sound (music) file as the transmission data, and the speaker is operated based on the transmission data received by the signal receiving device 3. Thereby, the illuminating fixture can output a sound (music) by the speaker.

In some cases, the plug 62 of the illuminating fixture 6 and the duct 300 may become incomplete connection. The incomplete connection means a state where the electrode plate of the plug 62 and the conductor of the duct 300 are engaged in such a manner that there exists a bad electrical connection, for example. When a current (a current with a rated value, for example) flows from the lighting device 1 to the light source 5 under the incomplete connection, an electric arc between the electrode plate of the plug 62 and the conductor of the duct 300 may occur. Since the DC voltage does not have zero crossing differently from the AC voltage, the electric arc may continue unless the incomplete connection between the plug 62 and the duct 300 is solved.

In the lighting system 4, in order to suppress the electric arc, the lighting device 1, the signal transmitting device 2, and the signal receiving device 3 are configured as follows. That is, the control circuit 23 of the signal transmitting device 2 is configured to, when switching the state of the light source 5 from an extinguished (turned-off) state to a lighting (turned-on) state, control the voltage conversion circuit 22 so as to change (adjust) the voltage value of the second DC voltage V2 to a voltage value according to the transmission data containing an activation command. Additionally, the lighting device 1 is configured to keep the state of the light source 5 at the extinguished state until receiving the activation command from the receiver circuit 31 of the signal receiving device 3. The lighting device 1 is also configured to change the state of the light source 5 to the lighting state when receiving the activation command from the receiver circuit 31.

Figure 7:
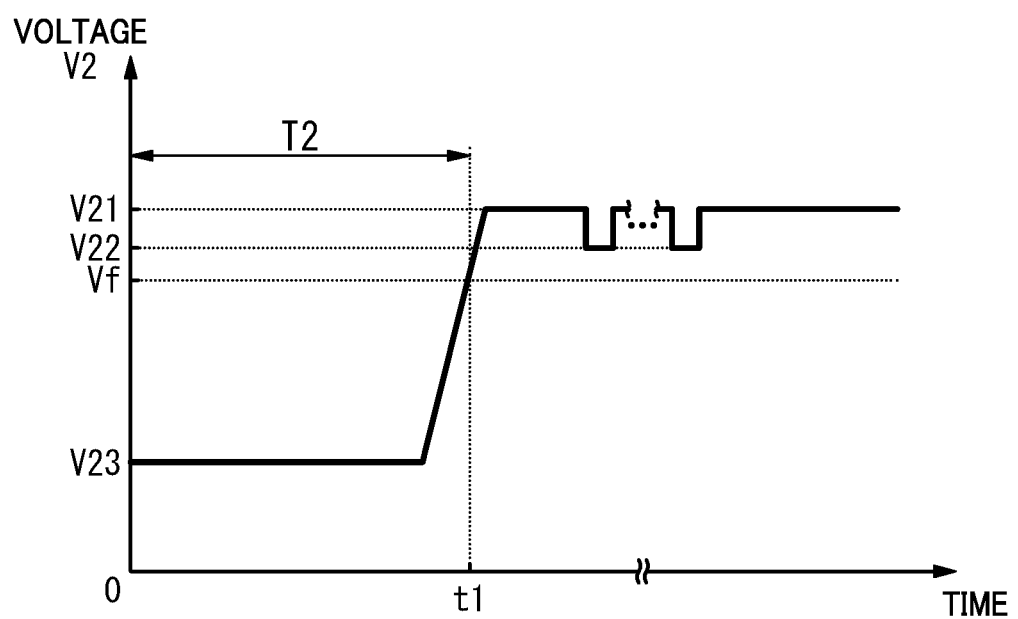
FIG. 7 is a timing chart for illustrating operations of the lighting system and the illuminating system.

For example, the control circuit 23 controls the voltage conversion circuit 22 to keep the voltage value of the second DC voltage V2 to a third voltage value V23 during a period from a point in time (t=0) at which the voltage value of the first DC voltage V1 increases from zero to the rated voltage value V10 to an end of a waiting period T2 (see FIG. 7). The third voltage value V23 is smaller than the voltage value Vf necessary for lighting the light source 5. Note that, the activation command may preferably be the light level control signal sent from the remote controller 9 through the signal line L3, for example. When receiving the light level control signal (activation command) from the remote controller 9 during the waiting period T2, the control circuit 23 controls the voltage conversion circuit 22 to change the voltage value of the second DC voltage V2 from the third voltage value V23 to the first voltage value V21 (see FIG. 7). The waiting period T2 ends at a point in time (t=t1) at which the voltage value of the second DC voltage V2 exceeds the voltage value Vf necessary for lighting the light source 5. After the end of the waiting period T2, the control circuit 23 converts the light level, which is indicated by the light level control signal that has been supplied from the remote controller 9 during the waiting period T2, into the transmission data. The control circuit 23 controls the voltage conversion circuit 22 to switch the voltage value of the second DC voltage V2 between the first voltage value V21 and the second voltage value V22 to thereby transmit the converted transmission data (see FIG. 7).

The lighting device 1 and the signal receiving device 3 start operating when the voltage value of the second DC voltage V2 is switched from zero to the third voltage value V23. Note that, even after the signal receiving device 3 starts operating, the receiver circuit 31 outputs the PWM signal with the duty cycle of 0 [%] to the constant current circuit 12 of the lighting device 1 until receiving the light level control signal from the signal transmitting device 2. When receiving the light level control signal from the signal transmitting device 2, the receiver circuit 31 outputs the PWM signal with the duty cycle (for example, 100 [%]) corresponding to the light level indicated by the light level control signal, to the constant current circuit 12. The drive circuit 120 of the constant current circuit 12 does not turn on (and off) the switching element Q1 when the duty cycle of the PWM signal received from the receiver circuit 31 is 0 [%]. When receiving the PWM signal with the duty ratio larger than 0 [%](for example, 100 [%]), the drive circuit 120 starts turning on and off of the switching element Q1. Consequently, the lighting device 1 does not light the light source 5 during the waiting period T2, and lights the light source 5 after the signal receiving device 3 receives the light level control signal sent from the signal transmitting device 2.

When the plug 62 of the illuminating fixture 6 and the duct 300 are in the incomplete connection, the receiver circuit 31 of the signal receiving device 3 cannot receive the transmission signal sent from the signal transmitting device 2. When the receiver circuit 31 cannot receive the transmission signal, the constant current circuit 12 of the lighting device 1 does not start turning on and off of the switching element Q1, and as a result no current flows from the lighting device 1 to the light source 5. When the constant current circuit 12 does not supply a current to the light source 5, the possibility of occurrence of the electric arc between the electrode plate of the plug 62 and the conductor of the duct 300 is significantly small even in the incomplete connection. Consequently, the lighting system 4 can suppress the electric arc. The incomplete connection may be, for example, a state where a connection point between the plug 62 and the duct 300 has high impedance and thus the third voltage value V23 is insufficient for the receiver circuit 31 of the signal receiving device 3 to determine change in the voltage. The incomplete connection may occur when an electrically insulating (foreign) material is sandwiched between the electrode plate of the plug 62 and the conductor of the duct 300. Examples of the high impedance include an electrically opened (disconnected) state.

Note that, the signal transmitting device 2 does not necessarily include a structure electrically and mechanically connectable to the ceiling-mounted socket 200. For example, the signal transmitting device 2 may be placed above the ceiling while its components such as the voltage conversion circuit 22 and the control circuit 23 are accommodated in a case made of metal or synthetic resin. The signal transmitting device 2 may be configured so that the housing 24 incorporates the DC power supply 8. The second power supply path L2 electrically interconnecting the signal transmitting device 2 and the lighting device 1 does not necessarily include the duct 300. For example, the second power supply path L2 may be constituted by an electric cable (e.g., a vinyl insulated vinyl sheathed cable) installed above the ceiling. The illuminating fixture 6 may not be limited to a spotlight, but may be a downlight or a flat illuminating fixture which is attached to a wall face for indirect lighting. The lighting device 1 and the signal receiving device 3 may not be incorporated in the body of the illuminating fixture. For example, a case for accommodating the lighting device 1 and the signal receiving device 3 may be separate from the body of the illuminating fixture, and the lighting-side output 11 of the lighting device 1 and the light source 5 may be electrically interconnected by an electric cable. The remote controller 9 may be configured to send the light level control signal by use of a communication medium such as infrared and a radio wave, instead of the signal line L3.

Figure 8:
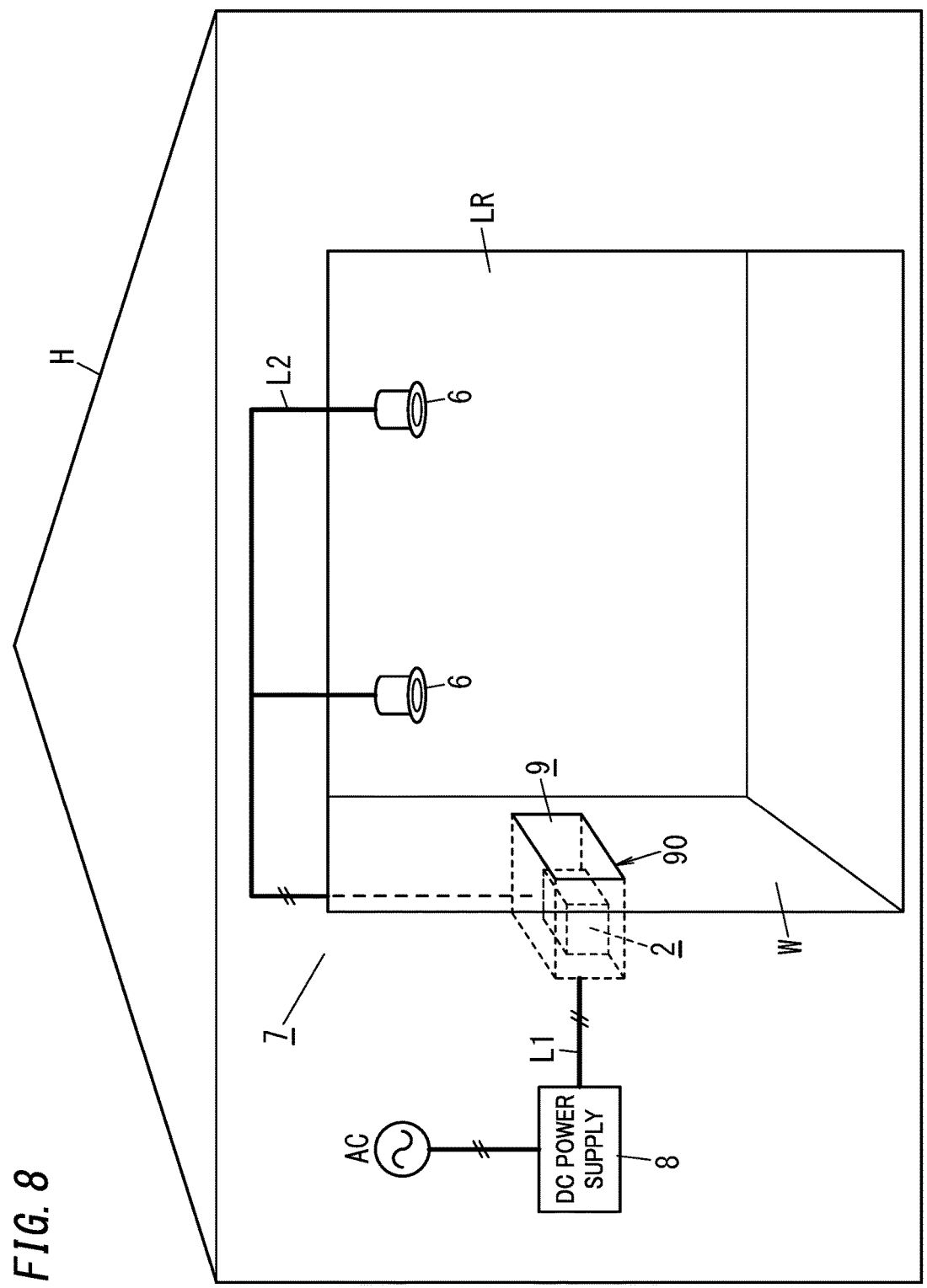
FIG. 8 is a system configuration diagram of a modification of the illuminating system.
Figure 9:
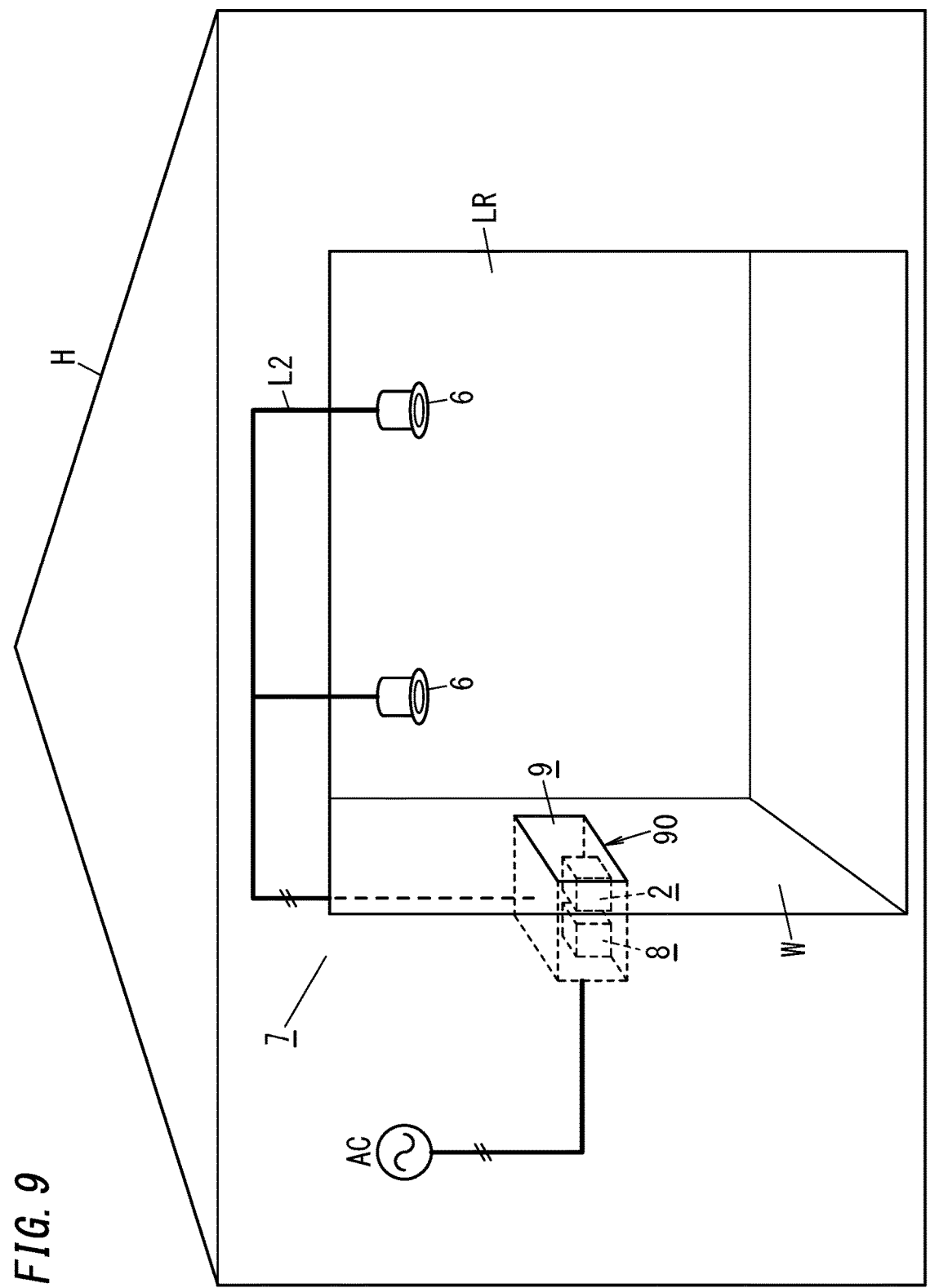
FIG. 9 is a system configuration diagram of another modification of the illuminating system.

Further, in the illuminating system 7, the signal transmitting device 2 may be accommodated in the body 90 of the remote controller 9, as shown in FIG. 8. Moreover, in the illuminating system 7, the signal transmitting device 2 and the DC power supply 8 may be accommodated in the body 90 of the remote controller 9, as shown in FIG. 9. The body 90 of the remote controller 9 is attached to a wall W of a living room LR of a residence H so that part (mainly, a rear part) of the body 90 is inserted into a recess created in the wall W (see FIG. 8 and FIG. 9). Note that, the remote controller 9 may include a touch panel instead of the first manual operation button 91 and the second manual operation button 92. The remote controller 9 may be configured to receive a wireless signal carried by infrared or a radio wave. This wireless signal may be sent from a wireless transmitter (not shown). The wireless transmitter may be configured to send, as the wireless signal, the control signal for indicating the light level.

As described above, a lighting system 4 of the first aspect includes a signal transmitting device 2, a signal receiving device 3, and a lighting device 1. The signal transmitting device 2 includes a transmitter-side input 20 for receiving a DC voltage V1, a transmitter-side output 21 for outputting a second DC voltage V2, a voltage conversion circuit 22 configured to convert the first DC voltage V1 into the second DC voltage V2, and a control circuit 23 configured to control the voltage conversion circuit 22 so that the second DC voltage has a voltage value which changes (a first voltage value V21 and a second voltage value V22) according to transmission data in a predetermined transmission period. The signal receiving device 3 includes a receiver-side input 30 electrically connected to the transmitter-side output 21 so as to receive the second DC voltage V2, and a receiver circuit 31 configured to obtain the transmission data by detecting change in the voltage value of the second DC voltage V2. The lighting device 1 is configured to light a light source 5 with the second DC voltage V2, and change a state of the light source 5 according to the transmission data received from the receiver circuit 31. The control circuit 23 is configured to, when switching the state of the light source 5 from an extinguished state to a lighting state, control the voltage conversion circuit 22 so that the second DC voltage V2 has a voltage value which changes according to the transmission data containing an activation command. The lighting device 1 is configured to keep the state of the light source 5 at the extinguished state until receiving the activation command (light level control signal) from the receiver circuit 31, and to change the state of the light source 5 to the lighting state when receiving the activation command from the receiver circuit 31.

In the lighting system 4 of the first aspect, no current flows from the lighting device 1 to the light source 5 unless the signal receiving device 3 receives transmission data containing the activation command sent from the signal transmitting device 2. Hence, the lighting system 4 of the first aspect can suppress the electric arc even when the signal transmitting device 2 and the lighting device 1 are in electrically incomplete connection, because the lighting device 1 does not allow a current to flow to the light source 5 in this case.

A lighting system 4 of the second aspect would be realized in combination with the lighting system 4 of the first aspect. In the lighting system 4 of the second aspect, the control circuit 23 is configured to control the voltage conversion circuit 22 to keep the voltage value of the second DC voltage V2 less than a reference voltage value (Vf) until receiving the activation command from an external device (remote controller 9), where the reference voltage value (Vf) is a voltage value necessary for the lighting device 1 to keep the state of the light source 5 at the lighting state. The control circuit 23 is configured, when receiving the activation command from the external device, to control the voltage conversion circuit 22 so as to change (adjust) the voltage value of the second DC voltage V2 to be larger than the reference voltage value Vf. Subsequently, the control circuit 23 controls the conversion circuit 22 to change (adjust) the voltage value of the second DC voltage V2 to the voltage value (the first voltage value V21 and the second voltage value V22) according to the transmission data containing the activation command.

The lighting system 4 of the second aspect can further suppress the electric arc in a period (waiting period T2) from the time when the signal transmitting device 2 receives the activation command from the external device (remote controller 9, for example) to the time when the signal transmitting device 2 changes the voltage value of the second DC voltage V2 to be equal to or larger than the voltage value Vf.

A lighting system 4 of the third aspect would be realized in combination with the lighting system 4 of the first or second aspect. In the lighting system 4 of the third aspect, preferably, the control circuit 23 is configured to define the transmission period as including a plurality of time slots having a constant time width T0. Preferably, the control circuit 23 is configured to, in a desired time slot, control the voltage conversion circuit 22 so that the voltage value of the second DC voltage V2 is kept changed within a time duration T1 shorter than the constant time width T0. The desired time slot is one of the plurality of time slots and in which the voltage value of the second DC voltage V2 is changed according to the transmission data.

The lighting system 4 of the third aspect can offer the advantage that a user is less likely to perceive change in the amount of the light source 5, because the time duration within which the voltage value of the second DC voltage V2 is changed can be shortened.

An illuminating system 7 of the fourth aspect includes the lighting system 4 of any one of the first to third aspects, and a light source 5 to be lit by the lighting device 1 of the lighting system 4.

The illuminating system 7 of the fourth aspect can offer the advantage of increasing the safety, because the lighting system 4 can suppress the electric arc.

An illuminating fixture 6 of the fifth aspect includes a lighting device 1 configured to light a light source 5 with an externally provided DC voltage (second DC voltage V2), and change a state of the light source according to transmission data; and a receiver circuit 31 configured to obtain the transmission data by detecting change in a voltage value of the DC voltage (second DC voltage V2), and provide the transmission data to the lighting device 1. The lighting device 1 is configured to keep the state of the light source 5 at an extinguished state until receiving an activation command included in the transmission data from the receiver circuit 31, and change the state of the light source 5 to the lighting state when receiving the activation command from the receiver circuit 31.

An illuminating fixture 6 of the sixth aspect includes the illuminating fixture 6 of the fifth aspect and the light source 5.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:
1. A lighting system, comprising:
a signal transmitting device including
a transmitter-side input for receiving a first DC voltage,
a transmitter-side output for outputting a second DC voltage,
a voltage conversion circuit configured to convert the first DC voltage into the second DC voltage, and
a control circuit configured to control the voltage conversion circuit so that the second DC voltage has a voltage value which changes according to transmission data in a predetermined transmission period;
a signal receiving device including
a receiver-side input electrically connected to the transmitter-side output so as to receive the second DC voltage, and
a receiver circuit configured to obtain the transmission data by detecting change in the voltage value of the second DC voltage; and
a lighting device configured to light a light source with the second DC voltage, and change a state of the light source according to the transmission data received from the receiver circuit,
the control circuit being configured to, when switching the state of the light source from an extinguished state to a lighting state, control the voltage conversion circuit so as to change the voltage value of the second DC voltage to a voltage value according to the transmission data containing an activation command, and
the lighting device being configured to
keep the state of the light source at the extinguished state until receiving the activation command from the receiver circuit, and
change the state of the light source to the lighting state when receiving the activation command from the receiver circuit.

2. The lighting system of claim 1, wherein:
the control circuit is configured to control the voltage conversion circuit to keep the voltage value of the second DC voltage less than a reference voltage value until receiving the activation command from an external device, the reference voltage value being a voltage value necessary for the lighting device to keep the state of the light source at the lighting state; and
the control circuit is configured, when receiving the activation command from an external device, to control the voltage conversion circuit so as to change the voltage value of the second DC voltage to be larger than the reference voltage value and subsequently change to the voltage value according to the transmission data containing the activation command.

3. The lighting system of claim 1, wherein the control circuit is configured to define the transmission period as including a plurality of time slots having a constant time width, and
in a time slot which is one of the plurality of time slots and in which the voltage value of the second DC voltage is changed according to the transmission data, control the voltage conversion circuit so that the voltage value of the second DC voltage is kept changed within a time duration shorter than the constant time width.

4. The lighting system of claim 2, wherein the control circuit is configured to define the transmission period as including a plurality of time slots having a constant time width, and
in a time slot which is one of the plurality of time slots and in which the voltage value of the second DC voltage is changed according to the transmission data, control the voltage conversion circuit so that the voltage value of the second DC voltage is kept changed within a time duration shorter than the constant time width.

5. An illuminating system, comprising:
the lighting system of claim 1; and
the light source lit by the lighting device of the lighting system.

6. An illuminating system, comprising:
the lighting system of claim 2; and
the light source lit by the lighting device of the lighting system.

7. An illuminating system, comprising:
the lighting system of claim 3; and
the light source lit by the lighting device of the lighting system.

8. An illuminating system, comprising:
the lighting system of claim 4; and
the light source lit by the lighting device of the lighting system.

9. An illuminating fixture, comprising:
a lighting device configured to light a light source with an externally provided DC voltage, and change a state of the light source according to transmission data; and
a receiver circuit configured to obtain the transmission data by detecting change in a voltage value of the DC voltage and provide the transmission data to the lighting device,
the lighting device being configured to
keep the state of the light source at an extinguished state until receiving an activation command included in the transmission data from the receiver circuit, and
change the state of the light source to the lighting state when receiving the activation command from the receiver circuit.

10. The illuminating fixture according to claim 9, further comprising the light source.

* * * * *